United States Patent Office 3,773,717
Patented Nov. 20, 1973

3,773,717
RUBBER FORMULATION
James P. Shoffner, Elk Grove Village, Ill., assignor to Universal Oil Products Company, Des Plaines, Ill.
No Drawing. Continuation-in-part of application Ser. No. 852,473, Aug. 22, 1969, now Patent No. 3,634,318. This application Aug. 17, 1971, Ser. No. 172,567
Int. Cl. C08c 11/46, 11/54; C08d 11/04
U.S. Cl. 260—45.9 R             13 Claims

ABSTRACT OF THE DISCLOSURE

Rubber formulation comprising phenylenediamine antiozonant, N-aryl-benzothiazolesulfenamide and another accelerator of different chemical composition. This combination provides long scorch time and rapid cure, as well as flexibility in producing rubber products of desired physical properties.

CROSS REFERENCE TO RELATED APPLICATION

This is a continuation-in-part of copending application Ser. No. 852,473, filed Aug. 22, 1969, now Pat. No. 3,634,318, Jan. 11, 1972.

BACKGROUND OF THE INVENTION

In the processing of rubber formulations, a sufficiently long scorch time is desired in order to provide a reasonable time to handle, transport and process the rubber formulation before it is heated and vulcanized to form the rubber product into the desired size and shape. The scorch time is considerably decreased when a phenylenediamine antiozonant is incorporated in the rubber formulation. The phenylenediamine antiozonant is necessary to protect the rubber product from attack by ozone. Parent application 852,473 demonstrated that the scorch time may be sufficiently prolonged by utilizing an N-aryl-2-benzothiazolesulfenamide in the rubber formulation.

DESCRIPTION OF THE INVENTION

In addition to the longer scorch time, it is also desired that the cure be effected rapidly. The present invention provides a novel method for obtaining both a long scorch time and a rapid cure. In addition, the novel method of the present invention provides flexibility in producing rubber products of desired physical properties.

In accordance with the present invention, the rubber formulation contains a phenylenediamine antiozonant, an N-aryl-2-benzothiazolesulfenamide and another accelerator of different chemical composition. Through mutually cooperative and interdependent coaction, the mixture of N-aryl-benzothiazolesulfenamide and other accelerator serves to provide a longer scorch time than obtainable when using the other accelerator alone and also a more rapid cure than is obtained when using the N-aryl-benzothiazolesulfenamide alone.

In one embodiment the present invention relates to natural or synthetic vulcanizable rubber formulation containing (1) phenylenediamine antiozonant, (2) N-phenyl-benzothiazolesulfenamide and (3) accelerator of different chemical composition.

In a specific embodiment the other accelerator is an N-alkyl-benzothiazolesulfenamide as, for example, N-tert-butyl-2-benzothiazolesulfenamide or an N - cycloalkyl-benzothiazolesulfenamide as, for example, N-cyclohexyl-2-benzothiazolesulfenamide.

In another specific embodiment the other accelerator of the thiuram type as, for example, tetramethylthiuram disulfide.

In still another embodiment the other accelerator is a guanidine derivative as, for example, diphenylguanidine.

In still another specific embodiment the other accelerator is mercaptobenzothiazole, mercaptobenzothiazyl disulfide, etc.

As hereinbefore set forth, one component of the rubber formulation is a phenylenediamine antiozonant. In one embodiment the phenylenediamine antiozonant is an N,N'-di-sec-alkyl-p-phenylenediamine in which each alkyl contains from 3 to about 20 carbon atoms and preferably from about 6 to about 10 carbon atoms. Particularly preferred antiozonants are N,N'-di-sec-heptyl-p-phenylenediamines and more particularly N,N' - di - (1,4 - dimethylpentyl) - p - phenylenediamine and N,N'-di-sec-octyl-p-phenylenediamines and particularly N,N'-di-(1-ethyl - 3-methylpentyl)-p-phenylenediamine and N,N'-di-(1-methylheptyl)-p-phenylenediamine. Other N,N'-di-sec-alkyl-p-phenylenediamines include N,N'-di-sec-hexyl-p-phenyldiamine, including N,N'-di-(1-methylpentyl)-p-phenylenediamine and N,N'-di-(1-ethylbutyl)-p-phenylenediamine, other N,N'-di-sec-heptyl-p-phenylenediamines including N,N'-di-(1-ethylpentyl)-p-phenylenediamine, N,N'-di-(1-propylbutyl) - p - phenylenediamine, other N,N' - di - sec-octyl-p-phenylenediamines including N,N'-di-(1 - propyl-pentyl)-p-phenylenediamine, N,N' - de-sec-nonyl-p-phenylenediamine including N,N'-di-(1-methyloctyl)-p-phenylenediamine, N,N'-di(1-ethylheptyl) - p - phenylenediamine, N,N'-di-(1-butylpentyl)-p-phenylenediamine, etc., and N,N'-di-sec-decyl - p - phenylenediamines including N,N'-di-(1-methylnonyl) - p - phenylenediamine, N,N'-di-(1-ethyloctyl) - p - phenylenediamine, N,N' - di - (1-propylheptyl) - p - phenylenediamine, N,N'-di-(1-butylhexyl)-p-phenylenediamine, etc.

In another embodiment, the phenylenediamine antiozonant is an N-phenyl-N'-sec-alkyl-p-phenylenediamine in which the alkyl contains from 3 to about 20 and preferably from 3 to 10 carbon atoms. Particularly preferred antiozonants in this embodiment include N-phenyl-N'-(1,3-dimethylbutyl) - p - phenylenediamine and N-phenyl-N'-(2-octyl)-p-phenylenediamine. Other antiozonants in this embodiment include N-phenyl - N' - isopropyl-p-phenylenediamine, N-phenyl-N'-(1-methylpropyl)-p-phenyl:enediamine, N-phenyl-N'-(sec-pentyl) - p - phenylenediamine including N-phenyl-N'-(1-methylbutyl)-p-phenylenediamine and N-phenyl-N'-(1-ethylpropyl)-p-phenylenediamine, other N-phenyl-N'-(sec-hexyl)-p-phenylenediamines including N-phenyl - N' - (1-methylpentyl)-p-phenylenediamine and N-phenyl - N' - (1-ethylbutyl)-p-phenylenediamine, N-phenyl-N'-(sec-heptyl)-p-phenylenediamines including N-phenyl-N'-(1-methylhexyl)-p-phenylenediamine, N - phenyl - N' - (sec-pentyl)-p-phenyleneenediamine, N-phenyl-N'-(1-methyl - 3 - methylbutyl)-p-phenylenediamine and N - phenyl-N'-(1-propylbutyl)-p-phenylenediamine, other N-phenyl - N' - (sec-octyl)-p-phenylene diamines including N-phenyl-N'-(1-ethylhexyl)-p-phenylenediamine, N - phenyl-N'-(1-ethyl-4-methylpentyl)-p-phenylenediamine and N-phenyl-N'-(1-propylpentyl)-p-phenylenediamine, N-phenyl-N'-(sec-nonyl)-p-phenylenediamines including N-phenyl - N' - (1-methyloctyl)-p-phenylenediamine, N - phenyl-N'-(1,6-di-methylheptyl)-p-phenylenediamine, N-phenyl - N' - (1 - ethylheptyl)-p-phenylenediamine and N-phenyl-N'-(1-propylhexyl)-p-phenylenediamine, and N-phenyl-N'-(sec-decyl)-p-phenylenediamines including N - phenyl-N'-(1-methylnonyl) - p - phenylenediamine, N-phenyl-N'-(1,7-dimethyloctyl)-p-phenylenediamine, N-phenyl-N'-(1-ethyloctyl)-p-phenylenediamine, N-phenyl-N'-(1,5 - diethylhexyl)-p-phenylenediamine, N-phenyl-N'-(1-butylhexyl)-p-phenylenediamine, etc.

In still another embodiment the phenylenediamine antiozonant is an N,N'-di-cycloalkyl-p-phenylenediamine and particularly N,N'-di-cyclohexyl-p-phenyldiamine.

The phenylenediamine antiozonants are available commercially or may be prepared in any suitable manner. In a preferred method, these are prepared by the reductive alkylation of p-phenylenediamine or p-nitroaniline with the desired ketone. For example, N,N' - di - (1-methylheptyl)-p-phenylenediamine is prepared by the reductive alkylation of 1 mol proportion of p-nitroaniline with 2 mol proportions of methyl hexyl ketone. Similarly, N-phenyl-N'-(1,3-dimethylbutyl) - p - phenylenediamine is prepared by the reductive alkylation of equal mol proportions of p-aminodiphenylamine, p-nitrodiphenylamine or p-nitrosodiphenylamine with methyl isobutyl ketone. In a similar manner, N-phenyl - N' - (1-methylheptyl)-p-phenylenediamine is prepared by the reductive alkylation of equal mol proportions of p-aminodiphenylamine with methyl hexyl ketone. Also, N,N'-di-cyclohexyl-p-phenylenediamine is prepared by the reductive alkylation of one mol proportion of p-nitroaniline with 2 mol proportions of cyclohexanone.

The reductive alkylation is effected in any suitable manner and generally under a hydrogen pressure of from about 100 to 3,000 psi. or more and more particularly of from about 1,000 to about 2,000 psi. and a temperature of from about 200° to about 500° F. and more particularly from about 250° to about 350° F. Generally an excess of ketone is used in the reaction mixture and may comprise up to about 20 or more mols of ketone per mol of p-nitroaniline or p-phenylenediamine. Any suitable reductive alkylation catalyst is used. One catalyst comprises an intimate mixture of copper oxide, chromium oxide and barium oxide. Other catalysts include those containing nickel, molybdenum, platinum and/or palladium. A particularly preferred catalyst comprises a composite of alumina with from about 0.1% to 10% or more of platinum, which composite may or may not contain chlorine and/or fluorine in a total concentration of from about 0.2% to 10% or more by weight of the composite.

Another component of the rubber formulation is an N-aryl-benzothiazolesulfenamide and particularly N-aryl-2-benzothiazolesulfenamide. A preferred species include N-phenyl-2-benzothiazolesulfenamide and the N-substituted-phenyl-2-benzothiazolesulfenamides. Specific compounds in this embodiment include N-phenyl-2-benzothiazolesulfenamide, N - p-methylphenyl-2-benzothiazolesulfenamide and N-p-methoxyphenyl-2-benzothiazolesulfenamide. Another substituted phenyl derivative is N-p-chlorophenyl-2-benzothiazolesulfenamide. Other N-alkylphenyl or N-dialkylphenyl derivatives thereof may be used. The alkyl group preferably contains from 1 to 6 carbon atoms each. Illustrative compounds include N-p-ethylphenyl-2-benzothiazolesulfenamide,
N-p-propylphenyl-2-benzothiazolesulfenamide,
N-p-butylphenyl-2-benzothiazolesulfenamide,
N-p-pentylphenyl-2-benzothiazolesulfenamide,
N-p-hexylphenyl-2-benzothiazolesulfenamide and corresponding compounds having the alkyl group in the ortho or meta position but not necessarily with equivalent results. Other illustrative compounds include N-3,5-di-methylphenylbenzothiazole-2-sulfenamide,
N-3,5-di-ethylphenylbenzothiazole-2-sulfenamide,
N-3,5-di-propylphenylbenzothiazole-2-sulfenamide,
N-3,5-di-butylphenylbenzothiazole-2-sulfenamide,
N-3,5-di-pentylphenylbenzothiazole-2-sulfenamide,
N-3,5-di-hexylphenylbenzothiazole-2-sulfenamide, corresponding compounds in which the alkyl groups are in the 2-3 positions, 2-4 positions, 2-5 positions or 2-6 positions.

The N-aryl-benzothiazole-2-sulfenamides generally are preferred for use in the present invention. It is understood that other N-arylthiazole-2-sulfenamides also may be used in accordance with the present invention but not necessarily with equivalent results. Other illustrative thiazolesulfenamides include N-aryl - 4,5 - di-methylthiazole-2-sulfenamide, N-aryl-4-ethyl-2-thiazolesulfenamide, etc., as well as corresponding naphthyl thiazolesulfenamides. In still another embodiment the N-aryl moiety may comprise N-naphthyl which may contain alkyl, alkoxy, nitro, chloro, etc., substitutions on the naphthyl ring.

The N-aryl-thiazolesulfenamides for use in the present invention are prepared by oxidative condensation in a particular manner. For example, mercaptobenzothiazole is reacted with the desired aryl amine in alcohol solvent and alkali metal hypochlorite at below 0° C. and specifically from —20 to 0° C. For example, N-phenyl-2-benzothiazolesulfenamide is prepared by forming a solution in methanol of 2-mercaptobenzothiazole, aniline and aqueous sodium hydroxide and cooling the solution to below 0° C. in an ice-alcohol bath. An aqueous solution of sodium hypochlorite is separately prepared and cooled to below 0° C. The second solution is added dropwise into the first solution with continuous stirring and the stirring is continued until the reaction is completed. The desired sulfenamide forms as a solid product which is recovered from the reaction mixture by filtering and either is utilized as such or is purified in any suitable manner, as, for example, by elution with ether from a column of alumina.

As hereinbefore set forth, improved results are obtained when the rubber formulation also contains an accelerator of different chemical composition. It appears that the N-aryl-benzothiazolesulfenamide may be used advantageously with a variety of accelerator compounds of different chemical composition. As hereinbefore set forth, the improved results are obtained due to a mutually cooperative and interdependent effect resulting from the use of the mixture. As still another advantage, the other accelerator preferably is a conventional accelerator presently being used in rubber formulations and, accordingly, is readily available in the open market.

In one embodiment the other accelerator is an N-alkyl-benzothiazolesulfenamide including particularly N-tert-butyl-2-benzothiazolesulfenamide. Other accelerators include N-tert-amyl - 2 - benzothiazolesulfenamide, N-sec-hexyl-2-benzothiazolesulfenamide, N - tert-hexyl-2-benzothiazolesulfenamide and other N-alkyl-2-benzothiazolesulfenamides in which the alkyl group contains from 1 to 10 carbon atoms. In another embodiment the other accelerator is N-cycloalkyl-2-benzothiazolesulfenamide. While the cyclohexyl derivative is preferred, it is understood that cycloalkyl derivatives containing from 3 to 12 carbon atoms in the ring may be used. In still another embodiment, the other accelerator is N-oxydiethylene-2-benzothiazolesulfenamide, N,N-diisopropyl - 2 - benzothiazolesulfenamide, N - morpholine-2-benzothiazolesulfenamide, etc.

In another embodiment the other accelerator is of the thiuram type and particularly tetramethylthiuram disulfide or tetraethylthiuram disulfide. Other accelerators in this embodiment include dimethyldiphenylthiuram monosulfide, dimethylphenylthiuram disulfide, dipentamethylenethiuram tetrasulfide, etc. In still another embodiment the other accelerator is a guanidine derivative and particularly diphenylguanidine. Still other accelerators include mercaptobenzothiazole, mercaptobenzothiazyl disulfide, etc. Still other accelerators are of the dithiocarbamate type including, for example, 2-benzothiazole-N,N-diethylthiocarbamyl sulfide, zinc diethyl-dithiocarbamate, etc.

From the above description, it will be noted that a number of different other accelerators may be used in conjunction with the N-aryl-benzothiazolesulfenamide. When desired, a mixture of the other accelerators and/or of the N-aryl-benzothiazolesulfenamides may be used. However, it is understood that the different N-aryl-benzothiazolesulfenamides and the different other accelerators are not necessarily equivalent. As hereinbefore set forth, another advantage to the present invention is that the N-aryl-benzothiazolesulfenamide and the other accelerator will be selected to produce a rubber product of the desired physical properties. In addition to the selection of specific compounds, the quantities thereof and the other ingredients of the rubber formulation will be chosen to suit the particular processing scheme in order to produce a rubber product of desired properties. These variations are readily determined by operators skilled in the rubber processing art.

The ingredients in the rubber formulation are used in a sufficient concentration to accomplish the desired purpose. The phenylenediamine antiozonant may be used in a concentration of from 1.5% to about 6% and more particularly from 2% to 4% by weight of the rubber hydrocarbon. The N-aryl-benzothiazolesulfenamide and the other accelerator may be used in a total concentration of from about 0.5% to about 3% and preferably from about 1% to about 2% by weight of the rubber hydrocarbon. When two or more of each of these ingredients are used, the total concentration generally will be within the range specified above. The concentrations set forth above are on the basis of the rubber hydrocarbon exclusive of the other components of the rubber formulation and are described as parts per 100 parts by weight of rubber hydrocarbon and abbreviated as phr. The other accelerator may comprise from 10% to 90% and preferably from 20% to 80% by weight of the N-aryl-benzothiazolesulfenamide, although these may be varied as desired but in all cases will comprise a mixture of these two ingredients.

Conventional rubber formulations, including oil extended rubber, may be used and may include, in addition to the antiozonant, N-aryl-benzothiazolesulfenamide and other accelerator, one or more antioxidants, retarders, fillers, softeners, extenders, wax, reinforcing agents, etc. Illustrative antioxidants include 2,6-di-tert-butyl-4-methylphenol, phenyl-beta-naphthylamine, 6-phenyl-2,2,4-trimethyl-1,2-dihydroquinoline, marketed under the tradename of "Santoflex-B," 2,2 - methylene-bis-(4-methyl-6-tert-butyl-phenol), the reaction product of acetone and diphenylamine, marketed under the tradename of "B.L.E.," etc. These antioxidants generally are used in a concentration of from about 0.5 to about 3% by weight of the rubber hydrocarbon.

When desired, the composition of the present invention also is used along with paraffin and/or microcrystalline wax. The wax generally is utilized in a concentration of from 0.5% to about 3% by weight of the rubber hydrocarbon.

Conventional milling procedure may be employed, with the N-aryl-benzothiazolesulfenamide, other accelerator and/or antiozonant being incorporated into the composition either separately or along with one or more other ingredients.

The novel method of the present invention is used in natural or synthetic rubbers and mixtures thereof which are subjected to vulcanization. Of the synthetic rubbers, butadiene-styrene rubber is used on a large scale. Other synthetic rubbers include cis-4-polybutadiene, butyl rubber, ethylene-propylene terpolymers, polymers of butadiene, polymers of isoprene, copolymers of butadiene with acrylonitrile, isobutylene, methyl methacrylate and/or other monomers. The rubbers produced by the polymerization of conjugated 1,3-dienes, either as polymers thereof or as copolymers thereof with other polymerizable compounds, are referred to as vulcanizable diene hydrocarbon rubbers. However, as hereinbefore set forth, the process of the present invention may be used with any vulcanizable rubber and referred to as vulcanizable diene rubber.

The following examples are introduced to illustrate further the novelty and utility of the present invention but not with the intention of unduly limiting the same.

EXAMPLE I

The rubber formulation was of the following recipe:

TABLE 1

| Ingredient: | Parts by weight |
|---|---|
| SBR 1502 | 100 |
| Furnace black | 40 |
| Extended oil | 10 |
| Zinc oxide | 3 |
| Sulfur | 2 |
| Antiozonant [1] | 2 |
| N-aryl-benzothiazolesulfenamide | (2) |
| Other accelerator | (2) |

[1] N,N'-di-2-octyl-p-phenylenediamine.
[2] As indicated.

The ingredients were incorporated by conventional milling procedure and the formulation was cured for 40 minutes at 284° F.

The scorch values were determined with the large rotor Mooney viscometer 250° F. (ASTM D–1077–55T). The values represent the number of minutes for the rubber formulation to increase in viscosity by 5 and then by 20 points. This method simulates conditions encountered during milling. A short 5 point value indicates a short cure time. Accordingly, a higher 5 point value is desired and indicates a longer scorch time. A high 20 point value indicates a slow curing. Accordingly, a lower 20 point reading is preferred. These values are compared by the difference between the 20 point value and the 5 point value, which difference preferably is a low number.

The following table reports the results when using 1.25 phr. of N-phenyl-2-benzothiazolesulfenamide, 1.25 phr. of N-cyclohexyl-benzothiazolesulfenamide and different mixtures thereof. It will be noted that N-cyclohexyl-benzothiazolesulfenamide is a conventional accelerator being used commercially at the present time.

TABLE 2

| Run No. | N-phenyl-benzothiazolesulfenamide, phr. | N-cyclohexyl benzothiazolesulfenamide | Mooney scorch | | |
|---|---|---|---|---|---|
| | | | 5 pt.r se | 20 pt. rise | Δ 20/5 |
| 1 | 1.25 | | 36.5 | 42.0 | 5.5 |
| 2 | | 1.25 | 14.0 | 17.1 | 3.1 |
| 3 | 1.15 | 0.1 | 30.1 | 37.5 | 7.4 |
| 4 | 1.0 | 0.25 | 25.4 | 28.8 | 3.4 |
| 5 | 0.9 | 0.35 | 23.3 | 26.2 | 2.9 |
| 6 | 0.75 | 0.50 | 20.1 | 22.1 | 2.0 |

It will be noted that the N-phenyl-2-benzothiazolesulfenamide produced a long scorch time as evidence by the high 5 point value. However, it will be noted that the rate of cure was not as rapid as generally desired as evidenced by the 20 point rise and by the difference by these two values. In contrast, the N-cyclohexyl-2-benzothiazole produced a low scorch time but did indicate a fairly rapid cure. However, as indicated in runs 5 and 6, both a reasonably satisfactory scorch time and an even more rapid cure were effected by using the mixture of these ingredients. It is surprising that an even lower delta 20/5 was obtained than when using the cyclohexyl derivative alone. Accordingly, there is mutual coaction between these components to produce these improved results. Furthermore, in this particular rubber formulation, the proportions of runs 5 and 6 are preferred over those of runs 3 and 4.

EXAMPLE II

Another series of evaluations was made utilizing substantially the same recipe as described in Example I. The additives in these samples comprised the following: (1) 1.25 N-phenyl-2-benzothiazolesulfenamide, (2) 1.25 phr. N-cyclohexyl-2-benzothiazolesulfenamide and (3) 1.00 N-phenyl-2-benzothiazolesulfenamide plus 0.25 N-cyclohexyl-2-benzothiazolesulfenamide.

The Mooney scorch properties were comparable to those reported in Example I. Antiozonant activity in all samples was satisfactory, with all samples going longer than 168 hours at 10% elongation before cracks appeared. The other physical properties are reported in the following table:

TABLE 3

| Run No. | N-phenyl-2-benzothiazolesulfenamide, phr. | N-cyclohexyl-2-benzothiazolesulfenamide, phr. | Shore A hardness | Ultimate elongation | Modulus 20% | Modulus 300% | Tensile strength |
|---|---|---|---|---|---|---|---|
| 7 | 1.25 | | 55 | 655 | 505 | 875 | 2,325 |
| 8 | | 1.25 | 61 | 545 | 760 | 1,250 | 2,460 |
| 9 | 1.00 | 0.25 | 59 | 615 | 640 | 1,055 | 2,405 |

It will be noted that the physical properties were all somewhat comparable and generally satisfactory for most purposes. However, as hereinbefore set forth, these properties may be varied somewhat by the selection of other ingredients and/or changes in the concentrations thereof.

EXAMPLE III

Another series of evaluations was made in substantially the same manner as described in Example I, except that the other accelerator comprised tetramethylthiuram disulfide. These results were as reported in the following table:

TABLE 4

| Run No. | N-phenyl-benzothiazolesulfenamide, phr. | Tetramethylthiuram disulfide, phr. | Mooney scorch 5 pt. rise | Mooney scorch 20 pt. rise | Δ20/5 |
|---|---|---|---|---|---|
| 1 | 1.25 | | 36.5 | 42.0 | 5.5 |
| 10 | | 1.25 | 14.4 | 16.5 | 2.1 |
| 11 | 1.15 | 0.1 | 40.0 | 44.9 | 4.9 |
| 12 | 1.10 | 0.15 | 38.4 | 42.8 | 4.4 |
| 13 | 1.05 | 0.20 | 34.4 | 38.6 | 4.2 |
| 14 | 1.0 | 0.25 | 31.6 | 34.4 | 2.8 |
| 15 | 0.90 | 0.35 | 28.2 | 30.8 | 2.6 |
| 16 | 0.75 | 0.50 | 25.6 | 28.4 | 2.8 |

Here again, it will be noted that the mixtures of N-phenyl-2-benzothiazolesulfenamide and tetramethylthiuram disulfide gave reasonable long scorch times and rapid curing.

EXAMPLE IV

In this example the other accelerator was N-tert-butyl-2-benzothiazolesulfenamide. When evaluated in a concentration of 1.25 phr. in the same basic formulation described in Example II, the 5 point Mooney scorch value was 20.3. The scorch time is prolonged by utilizing a mixture of 1.00 phr. of N-phenyl-2-benzothiazolesulfenamide and 0.25 phr. of N-tert-butyl-2-benzothiazolesulfenamide.

EXAMPLE V

In another evaluation utilizing the same basic formulation as described in Example II a mixture of 1.00 phr. of N-phenyl-2-benzothiazolesulfenamide and 0.25 phr. of diphenylguanidine produced Mooney scorch values of 5 point rise of 51.2 and 20 point rise of 57.5.

EXAMPLE VI

In another formulation of the same basic recipe as described in Example I, there is incorporated 1.00 phr. of N - p - methylphenyl-2-benzothiazolesulfenamide, 0.25 phr. of mercaptobenzothiazyl disulfide and 3 phr. of N-phenyl - N' - (1,3 - dimethylbutyl)-p-phenylenediamine. The rubber formulation will have a long scorch time and rapid cure, with the rubber being protected against cracking due to ozone.

EXAMPLE VII

Natural rubber is compounded in conventional manner to contain 3 phr. of N,N'-dicyclohexyl-p-phenylenediamine antiozonant, 0.9 phr. of N-p-chlorophenyl-2-benzothiazolesulfenamide and 0.4 phr. of N,N-diisopropyl-benzothiazolesulfenamide.

EXAMPLE VIII

This example illustrates the use of N-p-methoxyphenyl-2-benzothiazolesulfenamide and mercaptobenzothiazole in nitrile rubber. The nitrile rubber is compounded in conventional manner to include 3.5 phr. N,N'-dicyclohexyl-p-phenylenediamine, 1.00 phr. of N-p-methoxyphenyl-2-benzothiaozlesulfenamide and 0.25 phr. of mercaptobenzothiazole. Here again, the rubber formulation will have a long scorch value and rapid cure, with the rubber being protected against ozone cracking.

I claim as my invention:

1. Natural or synthetic vulcanizable diene hydrocarbon or nitrile rubber fromulation containing from about 1.5% to about 6% by weight of a phenylenediamine antiozonnant and from about 0.5% to about 3% by weight of at least two accelerators, one of said accelerators being an N-arylbenzothiazolesulfenamide selected from the group consisting of N-phenyl-2-benzothiazolesulfenamide, N-alkoxyphenyl - 2 - benzothiazolesulfenamide, N - chlorophenyl - 2 - benzothiazolesulfenamide, N-alkylphenyl-2-benzothiazolesulfenamide wherein the alkyl contains from 1 to 6 carbon atoms, and N-dialkylphenyl-2-benzothiazolesulfenamide in which each alkyl contains from 1 to 6 carbon atoms, and the other of said accelerators being selected from the group consisting of N-alkyl-benzothiazolesulfenamide, N - cycloalkylbenzothiazolesulfenamide, tetramethylthiuram disulfide, tetraethylthiuram disulfide, dimethyldiphenylthiuram monosulfide, dimethyldiphenylthiuram disulfide, dipentamethylenethiuram tetrasulfide, and diphenylguanidine, said other accelerator being in an amount of from 10% to 90% of said one accelerator.

2. The formulation of claim 1 in which the other accelerator is N-alkyl-2-benzothiazolesulfenamide.

3. The formulation of claim 2 in which the other accelerator is N-tert-butyl-2-benzothiazolesulfenamide.

4. The formulation of claim 1 in which the other accelerator is N-cycloalkyl-2-benzothiazolesulfenamide.

5. The formulation of claim 4 in which the other accelerator is N-cyclohexyl-2-benzothiazolesulfenamide.

6. The formulation of claim 1 in which the other accelerator is tetramethylthiuram disulfide.

7. The formulation of claim 1 in which the other accelerator is diphenylguanidine.

8. The formulation of claim 1 being butadiene-styrene copolymer.

9. The formulation of claim 1 being natural rubber.

10. The formulation of claim 1 being nitrile rubber.

11. The formulation of claim 1 in which the antiozonant is N,N'-di-sec-alkyl-p-phenylenediamine in which each alkyl contains from 3 to about 20 carbon atoms.

12. The formulation of claim 1 in which the antiozonant is N-phneyl-N'-sec-alkyl-p-phenylenediamine in which the alkyl contains from 3 to 20 carbon atoms.

13. The formulation of claim 1 in which the antiozonant is N,N'-di-cyclohexyl-p-phenylenediamine.

(References on following page)

References Cited

UNITED STATES PATENTS

| | | | |
|---|---|---|---|
| Re. 19,286 | 8/1934 | Zaucker et al. | 260—788 |
| 2,191,656 | 2/1940 | Harman | 260—789 |
| 2,321,305 | 6/1943 | Messer | 260—788 |
| 3,047,546 | 7/1962 | Lober et al. | 260—79.5 |
| 3,304,284 | 2/1967 | Cox | 260—45.9 |
| 3,304,285 | 2/1967 | Cox | 260—45.9 |
| 3,427,281 | 2/1969 | Young et al. | 260—45.9 |
| 3,491,069 | 1/1970 | Brooks et al. | 260—79.5 |
| 3,513,139 | 5/1970 | Coran et al. | 260—79.5 |
| 3,558,739 | 1/1971 | Kagarise | 260—79.5 |

DONALD E. CZAJA, Primary Examiner

R. A. WHITE, Assistant Examiner

U.S. Cl. X.R.

260—79.5 B, 788, 809